July 8, 1924.

E. PETTY 1,500,202

PROCESS OF PURIFYING MINERAL OIL

Filed Aug. 24, 1921

WITNESS:
Rob. R. Kitchel.

INVENTOR
Earl Petty
BY
Frank S. Busser
ATTORNEY.

Patented July 8, 1924.

1,500,202

UNITED STATES PATENT OFFICE.

EARL PETTY, OF WINFIELD, KANSAS, ASSIGNOR TO THE DE LAVAL SEPARATOR COMPANY, OF NEW YORK, N. Y., A CORPORATION OF NEW JERSEY.

PROCESS OF PURIFYING MINERAL OIL.

Application filed August 24, 1921. Serial No. 495,080.

*To all whom it may concern:*

Be it known that I, EARL PETTY, a citizen of the United States, residing at Winfield, county of Cowley, and State of Kansas, have invented a new and useful Improvement in Processes of Purifying Mineral Oil, of which the following is a full, clear, and exact description, reference being had to the accompanying drawings, which form a part of this specification.

It is known to treat an emulsion of mineral oil and water with chemicals for the purpose of weakening the bond between the oil and water in order to effect or facilitate their separation. Such chemical treatment involves considerable expense. It is the object of my invention to materially reduce the expense of this treatment. My invention is also applicable to other processes involving the addition of a treating agent to a contaminated liquid for the purpose of weakening or breaking the bond between the liquid and its contaminating ingredient, as, for example, the addition of caustic soda to acid-treated mineral oil lubricating stock.

The nature of my invention will be more readily understood by reference, in the description, to the accompanying drawings.

Figures 1, 2:
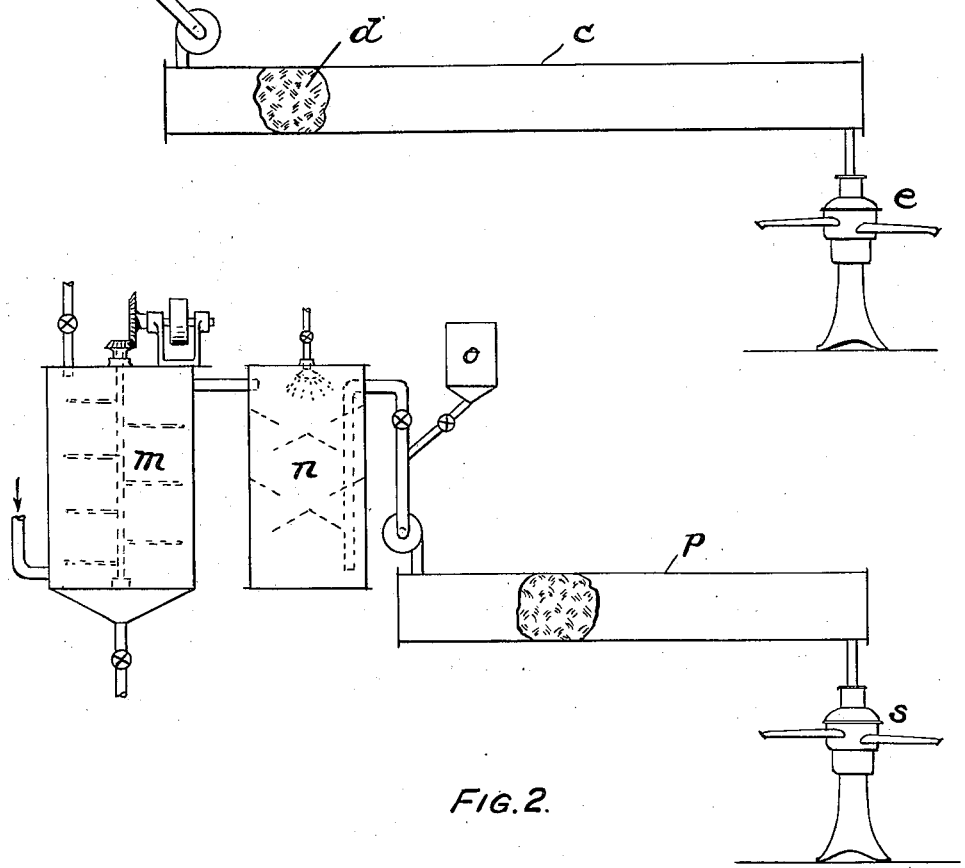
Fig. 1 is a diagram of an apparatus for resolving an emulsion of oil and water.
Fig. 2 is a diagram of an apparatus for removing acid and acidified products from an acid-treated mineral oil distillate.

It will be understood, however, that my process is not dependent for its execution upon any specific apparatus.

Referring first to Fig. 1: *a* is a reservoir containing an emulsion of oil and water; *b* a supply tank containing a treating agent adapted to resolve or break down, or facilitate the resolution or breaking down, of an emulsion of oil and water; *c* a relatively long cylinder adapted to receive both the emulsion and the chemical solution and filled with a permeable "pack" *d*, such as excelsior; and *e* a centrifugal separator adapted to receive the treated emulsion or mixture from the pack *d*.

A suitable treating agent is a saponifiable oil mixed with an alkali, as, for example, oleic acid, ammonia and soda ash; or some saponifiable fat mixed with an alkali and some neutral material to give it powder form. Known compositions of this character, such as "Treatolite" and "Gold Dust", are especially recommended.

The emulsion of oil and water and the treating agent are continuously fed, at a regulated rate, to the pack *d* and, after flowing therethrough, enter the centrifugal separator, where the oil and water are separated and separately discharged. The mere addition of the treating agent tends to resolve the emulsion, while the excelsior pack effects a wide distribution of the oil coated water particles or the water coated oil particles and a more intimate admixture of the treating agent, thereby permitting the use of a much smaller proportion of the treating agent than would otherwise be required.

There is considerable precipitation of the water within the body of the pack, and it would be possible, by dividing the pack into sections and by separately withdrawing the water precipitated in each section, to remove a large part of the water before centrifugal separation. Such change in the process is not, however, within the scope of the present invention, inasmuch as the process would be relatively slow, the separation would not be thorough and the proportions of water and oil in the emulsion flowing from the pack would be such as to add to the difficulties of centrifugal separation. The pack should therefore have no outlet except to the centrifuge, which is capable, after the breaking down of the emulsion, of effecting a separation into oil containing almost no water and water containing almost no oil. This result has been achieved by me by the use of a separator of the type shown in the Smyder Patent No. 1,283,343, dated October 29, 1918.

Heretofore, certain emulsions of oil and water have been so difficult of resolution, the expense of the treating agent has been so great, and the percentage of water in the separated oil has been so high, that it has been uneconomical to resolve the emulsions. By means of my process, the amount of treating agent to the gallon has been scarcely more than ten per cent. of that heretofore required, while the percentage of water in the separated oil is much below the permissible maximum percentage prescribed by the pipe line carriers. By the use of my process, therefore, the expense of resolving any emulsion of oil and water that cannot be satisfactorily resolved by mere centrifugation is much reduced, the reduction in some cases permitting the economical treatment of emulsions whose resolution would otherwise not be attempted.

Referring to Fig. 2: $m$ is an agitating tank for receiving a mineral oil distillate, such as lubricating stock, and sulphuric acid, the precipitated acid sludge being withdrawn from the bottom and the acid treated oil overflowing from the top into a tank $n$, wherein the oil is washed with water. From tank $n$ the oil flows into and through a pack $p$ of excelsior, which is also adapted to receive, from a supply tank $o$, a treating agent, such as a soda ash solution, thereby forming an emulsion of oil, soap and alkaline water. By means of the pack a more intimate mixture of the alkali with the acid treated oil is secured and at the same time the emulsion between the oil and the alkaline and soapy solution is rendered more readily and thoroughly separable by means of treatment in the centrifugal separator $s$.

Having now fully described my invention, what I claim and desire to protect by Letters Patent is:

The process of purifying an emulsion of mineral oil and a contaminating liquid, such as water, which comprises establishing a flow of the emulsion, establishing another flow of a treating agent adapted to facilitate the resolution of the emulsion, regulating the volume of the flow of the treating agent so as to continuously admix with the emulsion a substantially smaller proportion of the treating agent than would operate efficiently by mere admixture, forcing the mixture of emulsion and treating agent through a permeable mass of neutral material adapted to effect a wide distribution of the emulsion and more intimate mixture of the treating agent therewith, whereby the emulsion is substantially broken down in the course of its passage through said material and converted into a separable mixture of the constituents of the original emulsion, directing the entire mixture including such of the contaminating liquid as has been precipitated, to a locus of separation, and there subjecting the mixture to centrifugal force to effect a separation of the oil from the contaminating liquid.

In testimony of which invention, I have hereunto set my hand, at New York, on this 19th day of August, 1921.

EARL PETTY.

Witnesses:
JOHN G. PAUL,
R. R. WARREN.